(12) United States Patent
Ogino

(10) Patent No.: US 7,782,299 B2
(45) Date of Patent: Aug. 24, 2010

(54) APPARATUS AND METHOD FOR INPUTTING COMMANDS

(75) Inventor: Takayuki Ogino, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 855 days.

(21) Appl. No.: 11/085,819

(22) Filed: Mar. 21, 2005

(65) Prior Publication Data

US 2005/0212765 A1    Sep. 29, 2005

(30) Foreign Application Priority Data

Mar. 29, 2004    (JP) .............................. 2004-094043

(51) Int. Cl.
    *G06F 3/033* (2006.01)
(52) U.S. Cl. ...................................... 345/158; 715/863
(58) Field of Classification Search ................ 345/156, 345/157, 158, 159, 173, 175; 715/863
    See application file for complete search history.

(56) References Cited

U.S. PATENT DOCUMENTS

| | | | | |
|---|---|---|---|---|
| 5,900,863 | A * | 5/1999 | Numazaki .................... | 345/158 |
| 6,031,519 | A | 2/2000 | O'Brien | |
| 6,256,837 | B1 * | 7/2001 | Lan et al. ..................... | 16/334 |
| 6,310,407 | B1 | 10/2001 | Saito et al. | |
| 6,600,475 | B2 * | 7/2003 | Gutta et al. ................. | 345/156 |
| 7,343,026 | B2 | 3/2008 | Niwa et al. | |
| 2006/0168523 | A1 * | 7/2006 | Yoda et al. .................. | 715/728 |
| 2006/0279528 | A1 * | 12/2006 | Schobben et al. ........... | 345/156 |

FOREIGN PATENT DOCUMENTS

| | | |
|---|---|---|
| JP | 7-334299 | 12/1995 |
| JP | 10-154037 | 6/1998 |
| JP | 2000-006687 | 1/2000 |
| JP | 2000-066818 | 3/2000 |
| JP | 2000-75044 | 3/2000 |
| JP | 2000-330714 | 11/2000 |
| JP | 2001-097070 | 4/2001 |
| JP | 2004-258174 | 9/2004 |

* cited by examiner

*Primary Examiner*—Amr Awad
*Assistant Examiner*—Yong Sim
(74) *Attorney, Agent, or Firm*—Brinks Hofer Gilson & Lione

(57) ABSTRACT

A command-inputting apparatus includes a display for displaying an operation menu; a position-detecting unit for detecting a three-dimensional position of a command object specifying a command on the operation menu; and a command-detecting unit for determining a command point on the operation menu, based on the detected three-dimensional position of the command object and the viewpoint of the user specifying the command.

16 Claims, 6 Drawing Sheets

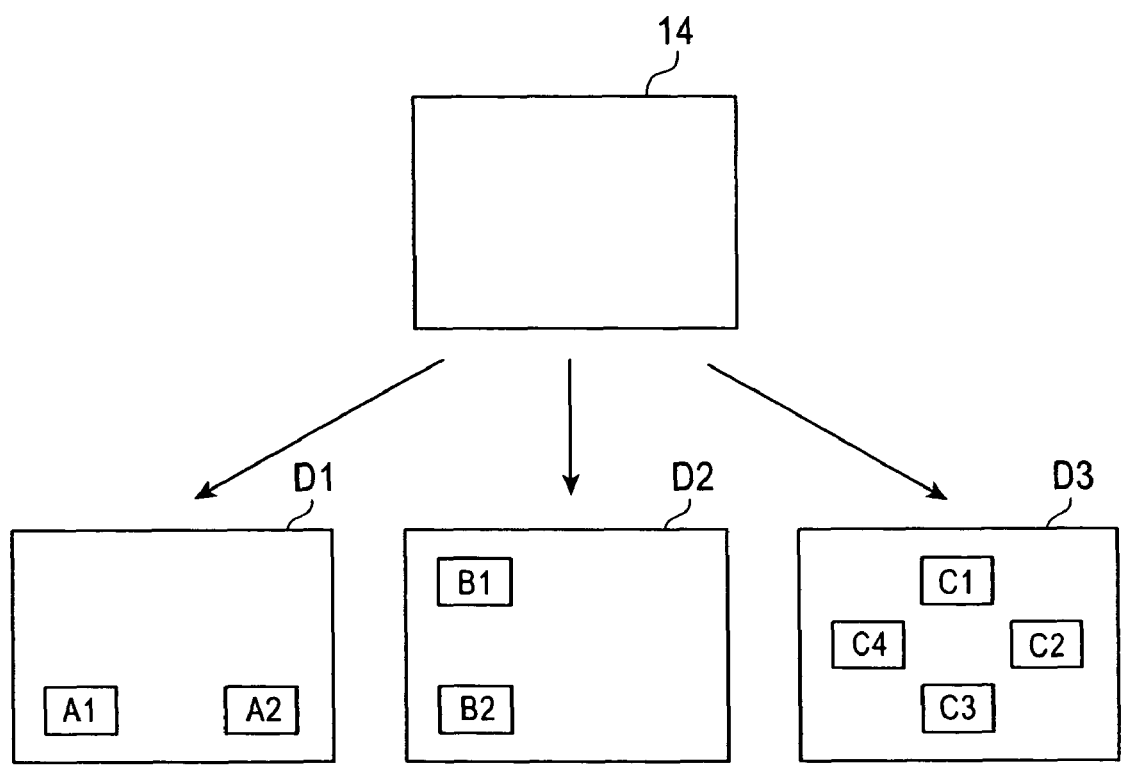

APPARATUS AND METHOD FOR INPUTTING COMMANDS

BACKGROUND OF THE INVENTION

1. Field of the Invention

The present invention relates to apparatuses and methods for inputting a variety of application commands through, for example, screens. Users input these commands referring to information displayed on the screens.

2. Description of the Related Art

A known command-inputting apparatus, disclosed in Japanese Unexamined Patent Application Publication No. 9-190278, especially pages 3 to 5 and FIGS. 1 to 7, displays a three-dimensional holographic image of an operation unit at a predetermined position in space and detects a three-dimensional user manipulation position when the user operates the operation unit. In this command-inputting apparatus, the operation unit is a three-dimensional virtual holographic image displayed in space. Thus, as disclosed in the foregoing document, a physical operation unit does not need to be installed in a space near the user, so that an open space can be obtained.

However, the known command-inputting apparatus, disclosed in the foregoing document, requires a complicated mechanism for displaying a holographic image, thereby increasing manufacturing costs. On the other hand, most of the current vehicle-mounted devices require a display. In this situation, two types of displaying unit need to be installed, that is, the mechanism for displaying the holographic image and the display for the vehicle-mounted device. Thus, the configuration is complicated. Moreover, the user needs to touch the operation unit of the holographic image with, for example, his or her finger. Thus, the user operation is limited. For example, a user out of reach of the operation unit cannot operate the operation unit.

SUMMARY OF THE INVENTION

Accordingly, in view of the problems described above, it is an object of the present invention to provide a command-inputting apparatus that eases restrictions on operation and that can be implemented at low cost.

In view of the problems described above, a command-inputting apparatus according to the present invention includes a display for displaying an operation menu; a position-detecting unit for detecting a three-dimensional position of a command object specifying a command on the operation menu; and a command-detecting unit for determining a command point on the operation menu, based on the detected three-dimensional position of the command object and a viewpoint of a user specifying the command. Even when the user is out of reach of the operation menu, the user can specify the command merely by pointing to a space between the operation menu and the user with the command object, thereby easing restrictions on operation. Moreover, in this arrangement, the operation menu can be displayed simply with the display. Thus, the configuration is simple as compared with an arrangement employing a holographic image, and the implementation costs can be decreased.

Preferably, the operation menu includes a user manipulation area, and the command-detecting unit determines whether the detected three-dimensional position of the command object corresponds to the user manipulation area. Thus, the selected user manipulation area can be reliably confirmed.

Preferably, a user manipulation space is a three-dimensional space defined between the user's viewpoint and the user manipulation area; and the command-detecting unit determines whether the detected three-dimensional position of the command object is in the user manipulation space. Thus, the user can select the user manipulation area on the operation menu merely by pointing to the user manipulation space, thereby easing restrictions on operation.

Preferably, a user manipulation space is defined between the user's viewpoint and the user manipulation area, a user's stretched arm with a predetermined length being capable of reaching the space, and the command-detecting unit determines whether the detected three-dimensional position of the command object is in the user manipulation space. Thus, the user manipulation space is limited, so that the command-detecting unit can detect command input with few errors.

Preferably, the command-inputting apparatus is simultaneously operated by a plurality of users; and the users have their own manipulation spaces that do not overlap each other. Thus, the users can be correctly recognized.

The display outputs video signals of an image of the operation menu, and the position and/or size of the user manipulation area on the operation menu can be preferably changed. Thus, the user can specify the command on a variety of operation menus.

Preferably, the command-inputting apparatus further includes an acknowledgement-returning unit that returns a predetermined acknowledgement to the user when the command-detecting unit determines that the detected three-dimensional position of the command object corresponds to the user manipulation area. Thus, the user can confirm, without anxiety, the completion of inputting the command even though the user does not feel a physical response when the user points to the user manipulation space to input the command.

Preferably, the command object is a finger of the user. Thus, the user can specify the command without special instruments, thereby easing restrictions on operation.

Preferably, the position-detecting unit detects a three-dimensional position of a portion of the command object, the portion being closest to the operation menu. Thus, the portion detected by the position-detecting unit is distinct when the user places the command object close to the operation menu, thereby facilitating correct command input.

Preferably, the position-detecting unit includes a transmitter for transmitting electromagnetic waves having a predetermined wavelength; a receiver for receiving reflected waves that are generated when the electromagnetic waves reach the command object; and a calculating unit for calculating the three-dimensional position of the command object, based on the reflected waves. In particular, preferably, the calculating unit calculates the three-dimensional position of the command object based on a propagation direction of the reflected waves and elapsed time of the propagating waves from the transmitter to the receiver. Thus, the three-dimensional position of the command object can be correctly detected.

Preferably, the electromagnetic waves are infrared rays. Thus, costs of the transmitter and the receiver are relatively low, thereby decreasing the implementation costs.

Preferably, the position-detecting unit detects a face position of the user before detecting the three-dimensional position of the command object; and the user's viewpoint is estimated, based on the detected user's face position. Thus, the user's viewpoint can be correctly determined, so that the command point can be correctly determined.

Preferably, the command-inputting apparatus further includes a child-detecting unit for determining whether the user is a child, based on the detected user's face position; and an application-processing unit for carrying out a process corresponding to the command point determined by the command-detecting unit and for putting limitations on this process when the child-detecting unit determines that the user is a child. Thus, processes that are not allowed for a child can be reliably prevented from being carried out.

Preferably, the command-inputting apparatus is mounted in a vehicle, and the position-detecting unit detects the user's face position when a vehicle speed sensor mounted in the vehicle determines that the vehicle starts to move. After the vehicle starts to move, the user's face position is unlikely to move. Thus, the command point can be correctly determined.

Preferably, the command-inputting apparatus is mounted in a vehicle, the user specifying the command is seated in a back seat of the vehicle, and the display is provided in front of the back seat. Thus, the usability of the command-inputting apparatus can be improved.

Preferably, the display includes a stack of liquid crystal panels that can display different operation menu images to respective users at different viewing angles. Thus, the users have their own operation menus that enable the users to independently input respective commands.

BRIEF DESCRIPTION OF THE DRAWINGS

FIG. 8 illustrates a display according to another embodiment for displaying different operation menus to respective users.

DESCRIPTION OF THE PREFERRED EMBODIMENTS

A command-inputting apparatus 100 according to an embodiment of the present invention will now be described in detail with reference to the drawings.

Figure 1:
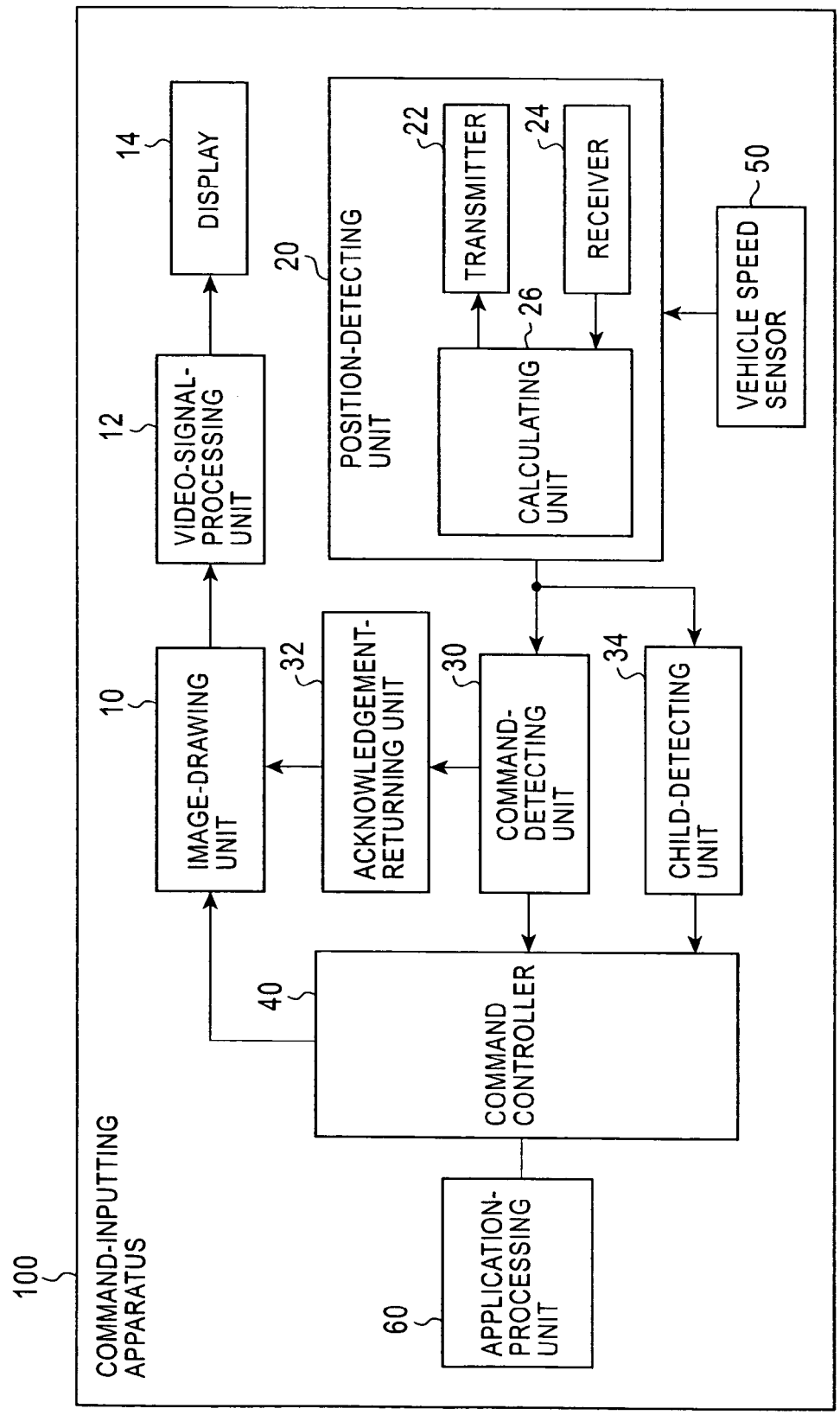
FIG. 1 is a block diagram illustrating the overall structure of a command-inputting apparatus according to an embodiment.

FIG. 1 is a block diagram illustrating the overall structure of this command-inputting apparatus 100. The command-inputting apparatus 100 includes an image-drawing unit 10, a video-signal-processing unit 12, a display 14, a position-detecting unit 20, a command-detecting unit 30, an acknowledgement-returning unit 32, a child-detecting unit 34, a command controller 40, a vehicle speed sensor 50, and an application-processing unit 60. The command-inputting apparatus 100 determines user commands to be input to a vehicle-mounted device.

The image-drawing unit 10 draws an image of an operation menu including at least one icon that a user can select. The video-signal-processing unit 12 generates video signals of this image to display the image on the display 14. This image can be changed according to need. For example, positions and/or sizes of the icons can be changed.

The position-detecting unit 20 is provided on the upper portion of the display 14 and detects a three-dimensional position of a command object specifying an icon to be selected. In this embodiment, it is assumed that a user seated in front of the display 14 stretches his or her arm to specify an icon with his or her finger. In this case, the user's finger or hand is the command object. The position-detecting unit 20 includes a transmitter 22 serving as a wave-emitting unit, a receiver 24 serving as a wave-receiving unit, and a calculating unit 26. The transmitter 22 transmits electromagnetic waves having a predetermined wavelength toward an area subjected to detection in front of the display 14. The receiver 24 receives reflected waves generated when the electromagnetic waves reach the user's finger specifying a command. The calculating unit 26 calculates a three-dimensional position of the user's fingertip closest to the display 14, based on the propagation direction of the reflected waves and the elapsed time of the propagating waves from the transmitter 22 to the receiver 24. Infrared rays are used as the electromagnetic waves to detect the three-dimensional position of the user's fingertip. This arrangement ensures correct detection of the three-dimensional position of the command object, in this case, the user's finger. Moreover, since infrared rays are used as the electromagnetic waves, costs of the transmitter 22 and the receiver 24 are relatively low. The position-detecting unit 20 also detects a three-dimensional position of the user's face.

After the position-detecting unit 20 detects the three-dimensional positions of the user's finger and face, the command-detecting unit 30 first determines an estimated viewpoint of the user specifying the command, based on the detected three-dimensional position of the user's face. Then, the command-detecting unit 30 determines a command point on the operation menu appearing on the display 14, based on the three-dimensional positions of the user's finger and viewpoint. As described above, the operation menu includes the icons to be selected. The command-detecting unit 30 determines whether the detected three-dimensional position of the user's finger corresponds to one of the icons on the operation menu.

The acknowledgement-returning unit 32 returns a predetermined acknowledgement to the user when the command-detecting unit 30 determines that the detected three-dimensional position of the user's finger corresponds to one of the icons on the operation menu. There are a variety of possible acknowledgements. For example, the acknowledgement-returning unit 32 may send a command to the image-drawing unit 10 so as to temporarily change the color of the selected icon for sending an acknowledgement to the user. In another case, an acknowledgement may be returned to the user with a buzzer tone. The acknowledgement from the acknowledgement-returning unit 32 ensures that the user can confirm, without anxiety, the completion of inputting the command even though the user does not feel a physical response when the user specifies a point in midair to input the command.

The child-detecting unit 34 determines whether the user is a child, based on the user's face position detected by the position-detecting unit 20.

The command controller 40 controls the process of displaying the operation menu to the user and of detecting the three-dimensional position of the command object when the user selects one of the icons on the operation menu. Data of the selected icon is sent to the application-processing unit 60. The application-processing unit 60 sends a command to the command controller 40 so as to display the operation menu and carries out a predetermined process corresponding to the data of the selected icon from the command controller 40. The application-processing unit 60 may be any vehicle-mounted device, for example, a navigator. The command-inputting apparatus 100 includes the application-processing unit 60 in FIG. 1. Alternatively, the application-processing unit 60 may be installed in a vehicle-mounted device that connects to the command-inputting apparatus 100, or the command-inputting apparatus 100 itself may be installed in the vehicle-mounted device.

The vehicle speed sensor 50 detects when a vehicle starts to move. The detection result is sent to the position-detecting unit 20. The position-detecting unit 20 detects the user's face position when the vehicle starts to move.

Figure 2:
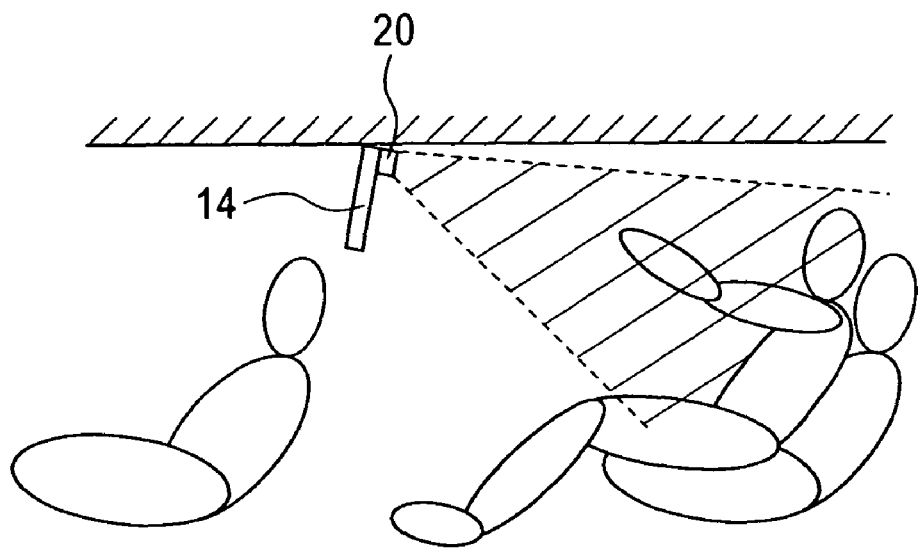
FIG. 2 illustrates positional relationships among a display, a position-detecting unit, and a user, as viewed from the side of a vehicle.
Figure 3:
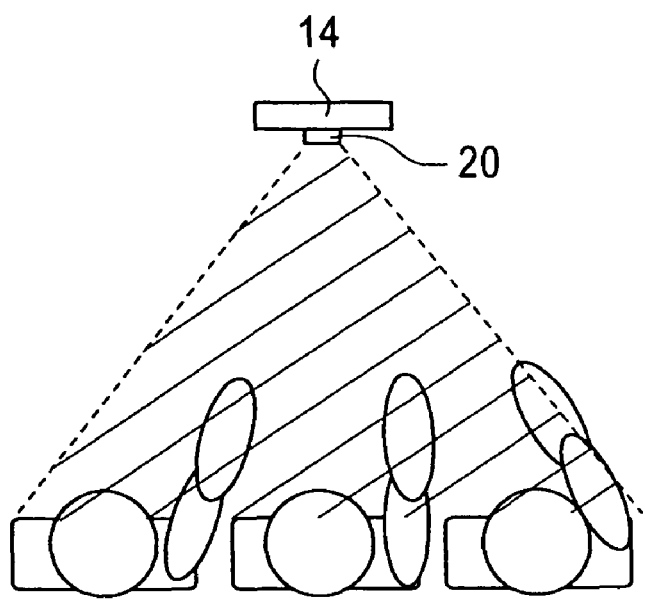
FIG. 3 illustrates positional relationships among the display, the position-detecting unit, and the user, as viewed from the top of the vehicle.

FIG. 2 illustrates positional relationships among the display 14, the position-detecting unit 20, and the user, as viewed from the side of a vehicle. FIG. 3 illustrates the positional relationships as viewed from the top of the vehicle.

As shown in FIG. 2, the display 14 can be provided on the ceiling of the vehicle in an area just behind a driver's seat and a front passenger's seat, and the position-detecting unit 20 is provided on the upper portion of the display 14. A user seated in a back seat stretches his or her arm to a user manipulation space (described later) between the user's viewpoint and the display 14 to select one of the icons on the operation menu appearing on the display 14. As shown in FIG. 3, the display 14 is provided at a position that is perpendicular to the center of the back seat and that is between the driver's seat and the front passenger's seat, as viewed from the top. It is assumed that at most three users are seated in the back seat, the users simultaneously manipulate the operation menu, and each user manipulation space does not overlap the other spaces.

Figure 4:
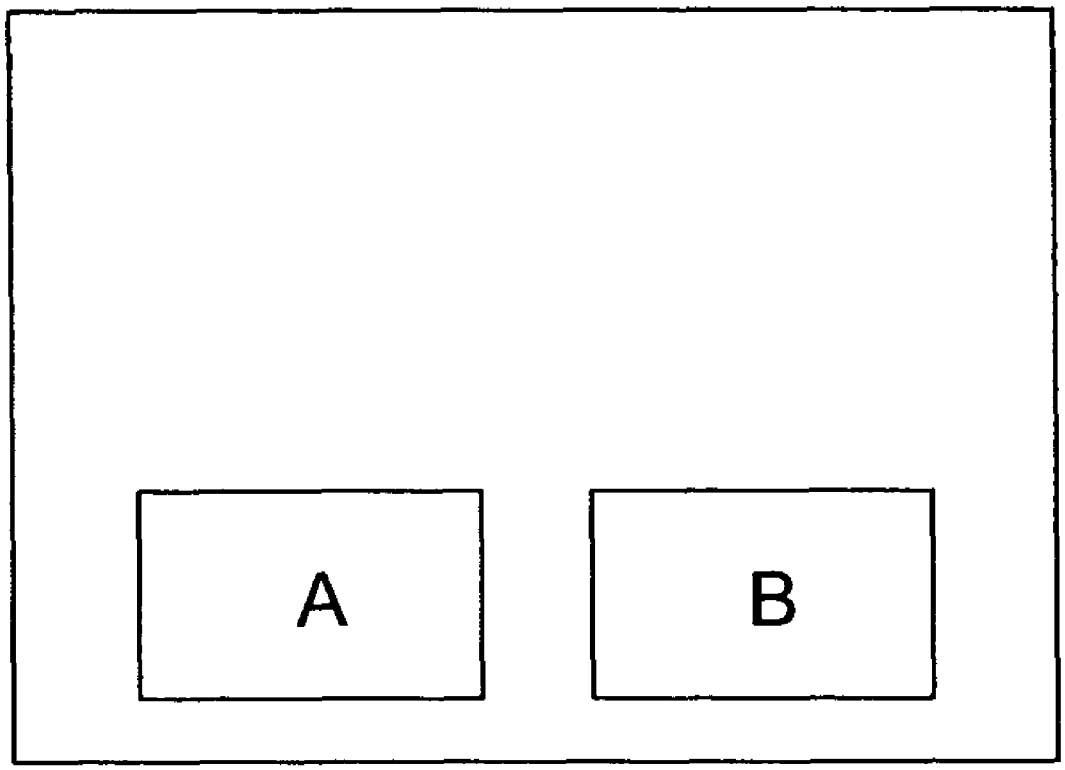
FIG. 4 illustrates a typical operation menu appearing on the display.

The user manipulation space that is provided for each user will now be described. FIG. 4 illustrates a typical operation menu appearing on the display 14. The operation menu includes two icons A and B subjected to user manipulation. Since these icons A and B are pointed to by the users with their fingers, the icons A and B need to have a predetermined minimum size and are preferably separated from each other as much as possible.

Figure 5:
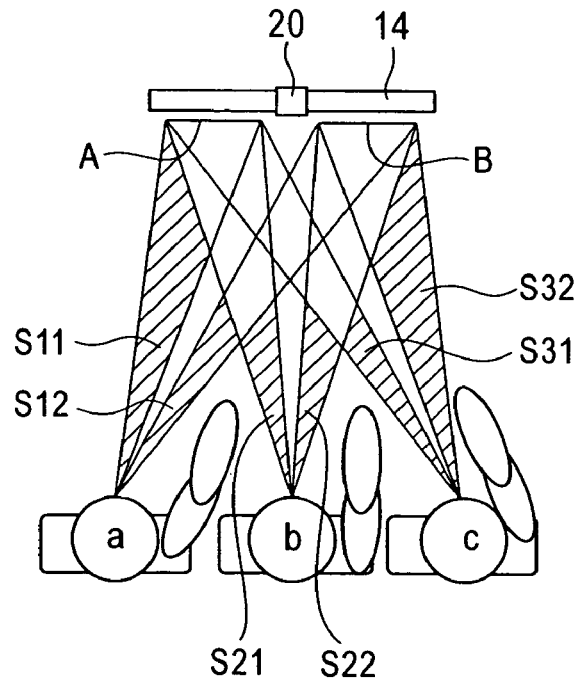
FIG. 5 illustrates typical user manipulation spaces defined in relation to the operation menu shown in FIG. 4.

FIG. 5 illustrates typical user manipulation spaces defined in relation to the operation menu shown in FIG. 4. In this case, three users a, b, and c are seated in the back seat at intervals. Each of the user manipulation spaces is defined as follows, except for a portion that overlaps other user manipulation spaces and that is not defined. The following two user manipulation spaces are defined for the user a: a user manipulation space S11 defined between the icon A and the viewpoint of the user a, and a user manipulation space S12 defined between the icon B and the viewpoint of the user a. The following two user manipulation spaces are defined for the user b: a user manipulation space S21 defined between the icon A and the viewpoint of the user b, and a user manipulation space S22 defined between the icon B and the viewpoint of the user b. The following two user manipulation spaces are defined for the user c: a user manipulation space S31 defined between the icon A and the viewpoint of the user c, and a user manipulation space S32 defined between the icon B and the viewpoint of the user c.

The command-detecting unit 30 determines that the user a selects the icon A when his or her finger enters the user manipulation space S11 and that the user a selects the icon B when his or her finger enters the user manipulation space S12. The command-detecting unit 30 determines that the user b selects the icon A when his or her finger enters the user manipulation space S21 and that the user b selects the icon B when his or her finger enters the user manipulation space S22. The command-detecting unit 30 determines that the user c selects the icon A when his or her finger enters the user manipulation space S31 and that the user c selects the icon B when his or her finger enters the user manipulation space S32.

In this arrangement, each of the users can select an icon on the operation menu merely by pointing to a corresponding user manipulation space, and can thus manipulate the operation menu with few physical restrictions.

Figure 6:
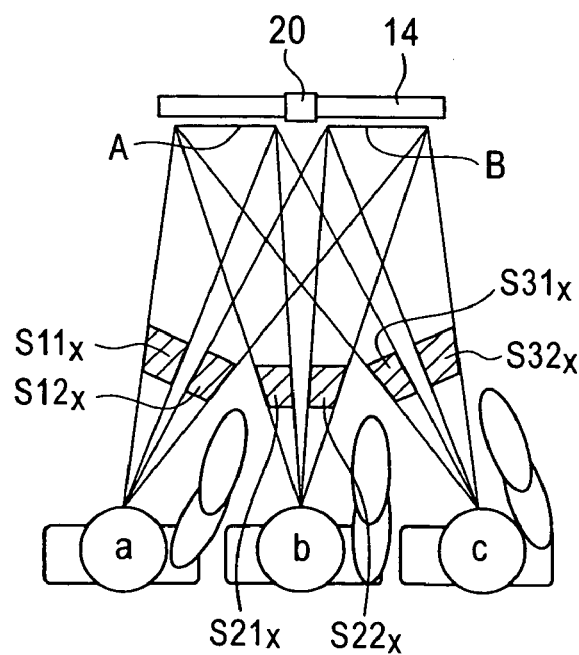
FIG. 6 illustrates other typical user manipulation spaces defined in relation to the operation menu shown in FIG. 4.

FIG. 6 illustrates other typical user manipulation spaces defined in relation to the operation menu shown in FIG. 4. Each of these user manipulation spaces, which a user's stretched arm with a predetermined length can reach, is defined as follows. The following two user manipulation spaces are defined for the user a: a user manipulation space $S11_X$ defined between the icon A and the viewpoint of the user a, and a user manipulation space $S12_X$ defined between the icon B and the viewpoint of the user a. The following two user manipulation spaces are defined for the user b: a user manipulation space $S21_X$ defined between the icon A and the viewpoint of the user b, and a user manipulation space $S22_X$ defined between the icon B and the viewpoint of the user b. The following two user manipulation spaces are defined for the user c: a user manipulation space $S31_X$ defined between the icon A and the viewpoint of the user c, and a user manipulation space $S32_X$ defined between the icon B and the viewpoint of the user c.

The command-detecting unit 30 determines that the user a selects the icon A when his or her finger enters the user manipulation space $S11_X$ and that the user a selects the icon B when his or her finger enters the user manipulation space $S12_X$. The command-detecting unit 30 determines that the user b selects the icon A when his or her finger enters the user manipulation space $S21_X$ and that the user b selects the icon B when his or her finger enters the user manipulation space $S22_X$. The command-detecting unit 30 determines that the user c selects the icon A when his or her finger enters the user manipulation space $S31_X$ and that the user c selects the icon B when his or her finger enters the user manipulation space $S32_X$. In this arrangement, each user manipulation space is limited, so that the command-detecting unit 30 can detect command input with few errors.

Figure 7:
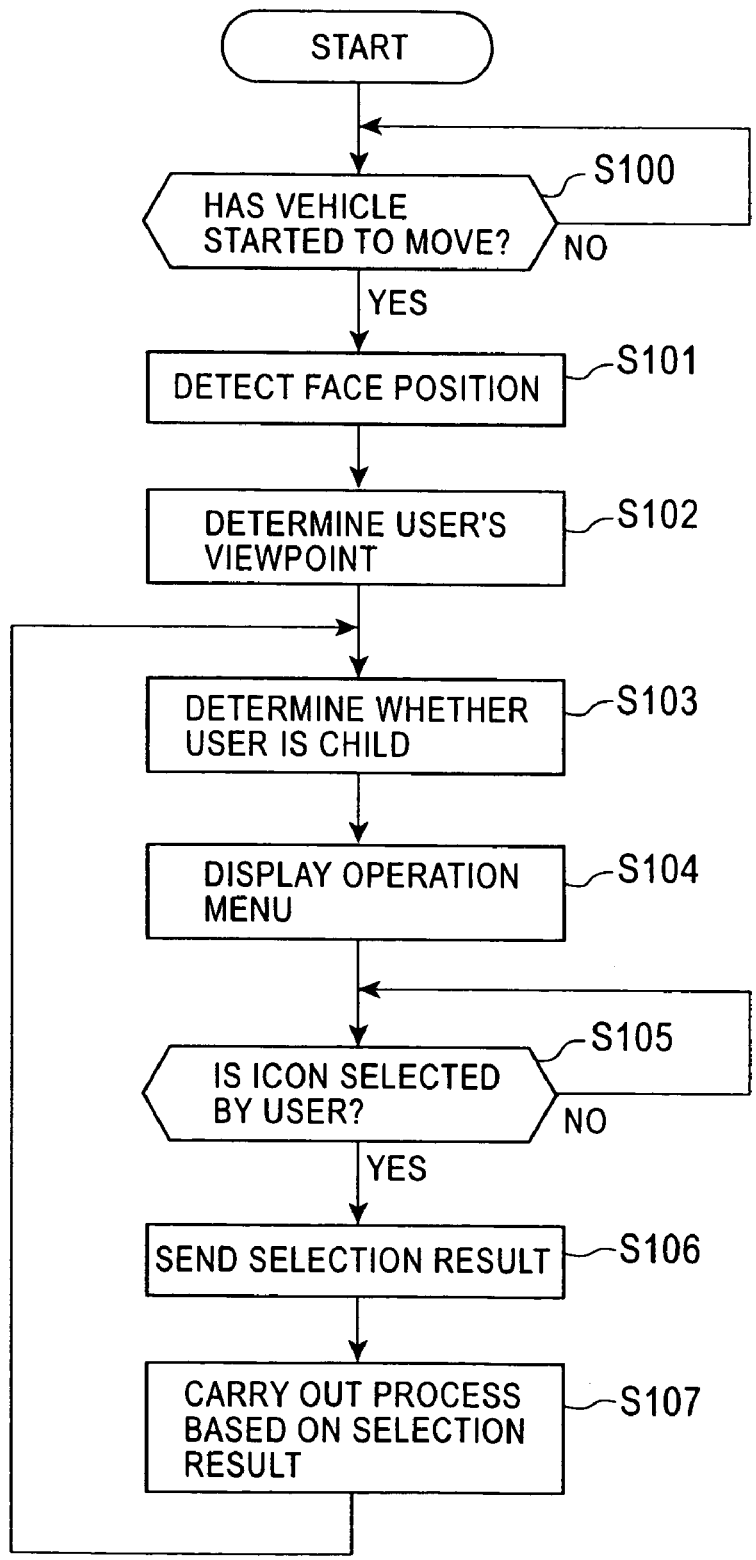
FIG. 7 is a flowchart illustrating the process in the command-inputting apparatus.

In the command-inputting apparatus 100, the process of determining a user command that is input to a vehicle-mounted device will now be described. FIG. 7 is a flowchart illustrating the process in the command-inputting apparatus 100.

In step S100, the vehicle speed sensor 50 detects the movement of a vehicle. When the vehicle starts to move, the process proceeds to step S101. In step S101, the position-detecting unit 20 detects three-dimensional positions of each user's finger and face. In step S102, the command-detecting unit 30 determines a viewpoint of each user, based on the detected position of the user's face. In step S103, the child-detecting unit 34 determines whether the user is a child. For example, when a user is apparently short in height, the child-detecting unit 34 determines that the user is child, and sends the result of this determination to the application-processing unit 60 through the command controller 40.

In step S104, the command controller 40 sends a command to the image-drawing unit 10 so as to draw an operation menu in response to a command from the application-processing unit 60, so that, for example, the operation menu shown in FIG. 4 appears on the display 14. In step S105, the command controller 40 waits until the command-detecting unit 30 determines that a user selects any icon. When a user selects any icon, the process proceeds to step S106. In step S106, the command controller 40 sends data of the selected icon and this user to the application-processing unit 60. In step S107, the application-processing unit 60 carries out a predetermined process in response to the command sent from the user.

However, when a child selects a command to carry out a process that is not allowed for a child, the application-processing unit 60, for example, does not carry out the process or carries out an alternative process instead of the disallowed process.

The present invention is not limited to the embodiments described herein, but various modifications may be made in the present invention without departing from the sprit of the present invention. While a vehicle-mounted command-inputting apparatus is described in the embodiments, the command-inputting apparatus of the present invention may be applicable to a variety of equipment other than a vehicle.

In the embodiments described above, each user points to a space with his or her finger to specify an icon on the operation menu appearing on the display, and the three-dimensional position of the finger is detected to process a command input. In another embodiment, the user may directly point to an icon printed on a fixed sheet, and the three-dimensional position of the finger is detected to process a command input.

In the embodiments described above, a single operation menu appears on the display 14. In another embodiment, the display 14 includes a stack of liquid crystal panels to simultaneously display different operation menus to respective users.

FIG. 8 illustrates a display according to this embodiment for displaying different operation menus to respective users. When the display 14 is viewed by user a, seated in the left portion of the back seat in FIGS. 5 and 6, an operation menu D1 including two icons A1 and A2 at the bottom is displayed. When the display 14 is viewed by user b, seated in the middle of the back seat in FIGS. 5 and 6, an operation menu D2 including two icons B1 and B2 at the left is displayed. Similarly, when the display 14 is viewed by user c, seated in the right portion of the back seat in FIGS. 5 and 6, an operation menu D3 including four icons C1, C2, C3, and C4 over the entire screen is displayed. Accordingly, users can independently select their own icons.

In the embodiments described above, the three-dimensional position of the command object is detected by transmitting the electromagnetic waves and by receiving the resulting reflected waves. Alternatively, the position-detecting unit may detect the three-dimensional position of the command object by other principles. For example, pictures shot by at least one camera can be analyzed to detect the three-dimensional position of the command object.

In the embodiments described above, the users point to the icons on the operation menu with their fingers. Alternatively, the users may point to the icons with command objects held in their hands, for example, styluses.

What is claimed is:

1. A command-inputting apparatus for receiving a user command specified by pointing, the apparatus comprising:
   a display for displaying an operation menu wherein the operation menu includes at least one user manipulation area, each user manipulation area being associated with a user command and being smaller in size than the display;
   a position-detecting unit for detecting a three-dimensional position of a user's face and for detecting a three-dimensional position of a command object spaced apart from and specifying a command on the operation menu by pointing; and
   a command-detecting unit for determining a viewpoint of the user based on the detected position of the user's face and for determining a command point on the operation menu based on the detected three-dimensional position of the command object and the viewpoint of a user specifying the command with the command object;
   wherein a user manipulation space is defined to be a three-dimensional space extending between an apex and a base, the apex corresponding to the user's viewpoint and the base corresponding to a user manipulation area included in the operation menu, and the command detecting unit determines that a command point specified on the operation menu by the command object is on a user manipulation area by detecting that the three-dimensional position of the command object has entered anywhere within the three-dimensional user manipulation space extending between the user's viewpoint and the user manipulation area; and
   wherein the command-inputting apparatus is configured for being simultaneously operated by a plurality of users, the user manipulation space is defined for each of the plurality of simultaneous users, the user manipulation spaces corresponding to the plurality of users do not overlap each other, and the command-detecting unit determines whether the detected three-dimensional position of the command object is in one of the user manipulation spaces.

2. The command-inputting apparatus according to claim 1, wherein
   the command-inputting apparatus is mounted in a vehicle, the user specifying the command is seated in a back seat of the vehicle; and
   the display is provided in front of the back seat.

3. The command-inputting apparatus according to claim 1, wherein
   a user manipulation space is further limited to a reduced three-dimensional space which a user's stretched arm with a predetermined length can reach; and
   the command-detecting unit determines whether the detected three-dimensional position of the command object is in the user manipulation space.

4. The command-inputting apparatus according to claim 1, further comprising:
   an acknowledgement-returning unit that returns a predetermined acknowledgement to the user when the command-detecting unit determines that the detected three-dimensional position of the command object corresponds to the user manipulation area.

5. The command-inputting apparatus according to claim 1, wherein
   the display outputs video signals of an image of the operation menu; and
   the position and/or size of the user manipulation area on the operation menu can be changed.

6. The command-inputting apparatus according to claim 1, wherein the command object is a finger of the user.

7. The command-inputting apparatus according to claim 1, wherein the position-detecting unit detects a three-dimensional position of a portion of the command object, the portion being closest to the operation menu.

8. The command-inputting apparatus according to claim 1, wherein the position-detecting unit comprises:
   a transmitter for transmitting electromagnetic waves having a predetermined wavelength;
   a receiver for receiving reflected waves that are generated when the electromagnetic waves reach the command object; and
   a calculating unit for calculating the three-dimensional position of the command object, based on the reflected waves.

9. The command-inputting apparatus according to claim 1, wherein
the position-detecting unit detects a face position of the user before detecting the three-dimensional position of the command object; and
the user's viewpoint is estimated, based on the detected user's face position.

10. The command-inputting apparatus according to claim 5, wherein the display includes a stack of liquid crystal panels that can display different operation menu images to respective users at different viewing angles.

11. The command-inputting apparatus according to claim 8, wherein the calculating unit calculates the three-dimensional position of the command object, based on a propagation direction of the reflected waves and elapsed time of the propagating waves from the transmitter to the receiver.

12. the command-inputting apparatus according to claim 8, wherein the electromagnetic waves are infrared rays.

13. The command-inputting apparatus according to claim 9, wherein
the command-inputting apparatus is mounted in a vehicle; and
the position-detecting unit detects the user's face position when a vehicle speed sensor mounted in the vehicle determines that the vehicle starts to move.

14. A command-inputting apparatus for receiving a user command specified by pointing, the apparatus comprising:
a display for displaying an operation menu wherein the operation menu includes at least one user manipulation area, each user manipulation area being associated with a user command and being smaller in size than the display;
a position-detecting unit for detecting a three-dimensional position of a user's face and a three-dimensional position of a command object spaced apart from and specifying a command on the operation menu by pointing;
a command-detecting unit for determining a command point on the operation menu based on the detected three-dimensional position of the command object and a detected viewpoint of the user specifying the command with the command object, where a command point is determined to be on a particular user manipulation area when the detected three-dimensional position of the command object has entered anywhere within a three-dimensional user manipulation space extending between an apex corresponding to the user's viewpoint and a base corresponding to the user manipulation area; and
an application-processing unit for carrying out a process corresponding to the command point determined by the command-detecting unit and for restricting this process when a height of the detected position of the user's face is determined to be within a predetermined lower range;
wherein the command-inputting apparatus is configured for being simultaneously operated by a plurality of users, the user manipulation space is defined for each of the plurality of simultaneous users, manipulation area, the user manipulation spaces corresponding to the plurality of users do not overlap each other, and the command-detecting unit determines whether the detected three-dimensional position of the command object is in one of the user manipulation spaces.

15. A command-inputting method for receiving a user command specified by pointing, the method comprising:
displaying an operation menu on a display wherein the operation menu includes at least one user manipulation area, each user manipulation area being associated with a user command and being smaller in size than the display;
detecting a three-dimensional position of a user's face;
detecting a three-dimensional position of a command object spaced apart from and specifying a command on the operation menu by pointing;
determining a viewpoint of the user based on the detected position of the user's face; and
determining a command point on the operation menu based on the detected three-dimensional position of the command object and the viewpoint of a user specifying the command with the command object;
wherein a user manipulation space is defined to be a three-dimensional space extending between an apex and a base, the apex corresponding to the user's viewpoint and the base corresponding to a user manipulation area included in the operation menu, and the method further comprises determining that a command point specified on the operation menu by the command object is on a user manipulation area by detecting that the three-dimensional position of the command object has entered anywhere within the three-dimensional user manipulation space extending between the user's viewpoint and the user manipulation area; and
wherein the user manipulation space is defined for each of a plurality of simultaneous users, the user manipulation spaces corresponding to the plurality of users do not overlap each other, and the three dimensional position of a command object is in one of the user manipulation spaces.

16. The method according to claim 15, wherein the position-detecting step comprises:
transmitting electromagnetic waves having a predetermined wavelength;
receiving reflected waves that are generated when the electromagnetic waves reach the command object; and
calculating the three-dimensional position of the command object, based on the reflected waves.

* * * * *

UNITED STATES PATENT AND TRADEMARK OFFICE
CERTIFICATE OF CORRECTION

PATENT NO. : 7,782,299 B2 Page 1 of 1
APPLICATION NO. : 11/085819
DATED : August 24, 2010
INVENTOR(S) : Takayuki Ogino It is certified that error appears in the above-identified patent and that said Letters Patent is hereby corrected as shown below:

In the Claims

In column 10, claim 14, line 4, after "simultaneous users," delete "manipulation area,".

Signed and Sealed this

Twelfth Day of October, 2010

David J. Kappos
*Director of the United States Patent and Trademark Office*